C. M. CHAMBERLAIN.
EXTRACTION APPARATUS.
APPLICATION FILED JULY 13, 1907.
899,512.
Patented Sept. 29, 1908.
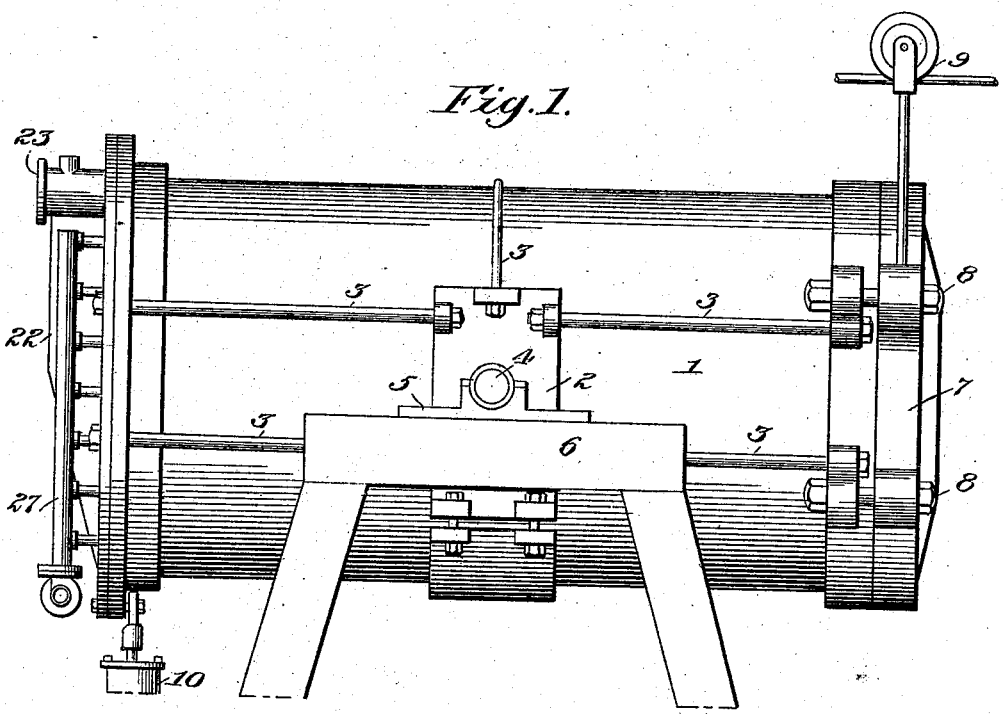
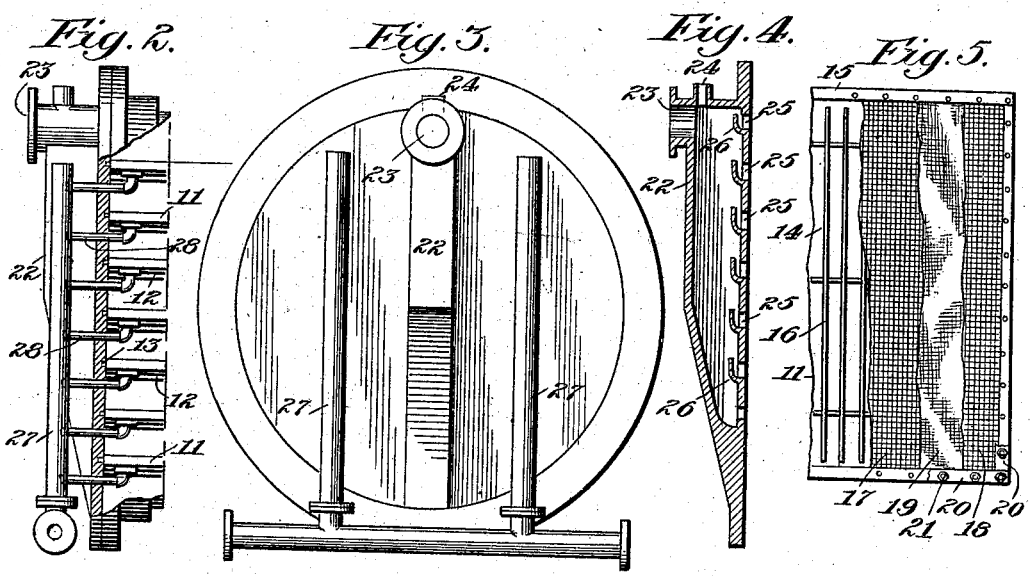
Witnesses:
Geo. E. Garrett
Chas. H. Potter
Inventor:
Clarence M. Chamberlain
by Byrnes & Townsend
Att'ys.

UNITED STATES PATENT OFFICE.

CLARENCE M. CHAMBERLAIN, OF PUEBLO, COLORADO.

EXTRACTION APPARATUS.

No. 899,512.  Specification of Letters Patent.  Patented Sept. 29, 1908.

Application filed July 13, 1907. Serial No. 383,643.

*To all whom it may concern:*

Be it known that I, CLARENCE M. CHAMBERLAIN, a citizen of the United States, residing at Pueblo, in the county of Pueblo and State of Colorado, have invented certain new and useful Improvements in Extraction Apparatus, of which the following is a specification.

This invention is an extraction apparatus, designed particularly for the treatment of crushed ores, slimes or other metal-bearing material.

A preferred embodiment of the invention is shown in the accompanying drawing, wherein:

Figure 1 is a side elevation of the vessel; Fig. 2 is a vertical section through the rear or filling end thereof; Fig. 3 is an elevation of the rear or filling end; Fig. 4 is a vertical section through the distributing chamber; and Fig. 5 is a fragmentary plan view of a preferred form of filter tray.

Referring to the drawing, 1 represents an extraction vessel or filter tray, shown as cylindrical in form, and having at its central portion a reinforcing band or saddle 2 secured by stays 3 and carrying trunnions 4, mounted in bearings 5 upon a suitable standard 6. The front or discharge end of the vessel is closed by a head 7, which may be secured in position by bolts 8 or other suitable devices, and may be supported when detached by an overhead trolley 9. The vessel is adapted to be tilted forward for discharging the solid contents thereof, and is provided for this purpose with a suitable pneumatic or hydraulic lift 10.

Interiorly the vessel is provided with any desired number of superposed filter-trays 11, removably supported upon angle-irons 12 (Fig. 2) upon opposite sides of the vessel; the trays form a substantially tight joint with the interior walls of the vessel, a suitable packing as indicated at 13 being usually employed. As shown in Fig. 2 the filtering-trays subdivide the vessel into a plurality of independent compartments. A preferred form of tray, as shown in detail in Fig. 5, comprises a sheet-metal plate or pan 14, riveted or otherwise secured to a steel frame 15.

16 is a skeleton support for the filter, which comprises upper and lower screens 17, 18 of metal, with interposed canvas or other suitable filter 19. The whole is fixed firmly in position by clamping strips 20, secured by bolts 21. The filter so constructed may be handled as a unit and readily removed from the vessel and inserted therein.

A preferred distributing device for supplying the material to be filtered simultaneously to the several compartments while preventing it from flowing from one compartment or tray to another during the operation of the apparatus is shown as comprising a distributing chamber 22 having an upper inlet 23 for slimes or the like, and an auxiliary inlet 24 for air, steam, water, solvent liquid or the like. The distributing chamber communicates with each compartment of the extraction vessel, and preferably with the upper portion of each compartment, through inlet apertures 25 provided with suitable inlet seals or guards for preventing the material from flowing from the compartments to the level of the bottom of the inlet aperture. These seals may comprise upwardly turned elbows, bent or upwardly inclined piping or conduits, or equivalent constructions as will be readily understood. A simple and effective construction is shown in the drawing wherein the guards 26 are cast integral with the rear head of the vessel and extend upwardly in such manner as to constitute seals or traps for the apertures 25, determining the level of the contents of the several compartments.

The filtered liquid is discharged from the lower portion of each tray, preferably into standards 27, by means of branch pipes 28 secured to the pans 14 and projecting outwardly through the rear head, this construction facilitating the withdrawal and insertion of the trays as above mentioned. The branch pipes 28 may be disposed above the level of the liquid in the compartments as determined by the inlet seals, in which case no packing is required.

The operation of the apparatus will be readily understood, and is as follows: The material is supplied as a liquid or pulp to the distributing chamber 22 and thence to the several compartments, filling the same to a suitable depth as determined by the inlet seals, the filtered liquid flowing out through the branch pipes 28 and standards 27 and being subjected to such further treatment as may be required. When a suitable quantity of material has been collected upon the trays, the cake or deposit is loosened by forcing water upwardly to and through the same, preferably through the branch pipes 28; the head 7 is then removed and the contents of the vessel discharged, the vessel being inclined forwardly to facilitate this operation. The vessel is then restored to its normal position, the head 7 is replaced, and the apparatus is in condition for further service.

I claim:

1. An extraction apparatus comprising a vessel having a body and separable heads, superposed filter-beds in said vessel dividing the same into compartments, and a common distributing chamber for said compartments integral with one of said heads.

2. An extraction apparatus comprising a vessel, superposed filter-beds therein dividing the same into compartments, a common distributing chamber for said compartments, and inlet seals between the distributing chamber and said compartments.

3. An extraction apparatus comprising a vessel having a body and separable heads, superposed filter-beds in said vessel dividing the same into compartments, a common distributing chamber for said compartments integral with one of said heads, and separate outlets for the filtered liquid.

4. An extraction apparatus comprising a substantially liquid-tight vessel having a body and separable heads, means for inclining the same, superposed filter-beds dividing said vessel into compartments, and a common distributing chamber for said compartments integral with one of said heads.

5. An extraction apparatus comprising a substantially liquid-tight vessel, means for inclining the same, superposed filter-beds dividing said vessel into compartments, a common distributing chamber for said compartments and inlet seals between the distributing chamber and said compartments.

6. An extraction apparatus comprising a vessel, a filter-bed therein, an inlet, and an inlet seal between said inlet and filter-bed.

7. An extraction apparatus comprising a substantially liquid-tight vessel, means for inclining the same, a filter-bed therein, an inlet, and an inlet seal between said inlet and filter-bed.

In testimony whereof, I affix my signature in presence of two witnesses.

CLARENCE M. CHAMBERLAIN.

Witnesses:
  H. F. SIMEON,
  CLAUDE M. PARKER.